Patented Mar. 8, 1949

2,463,831

UNITED STATES PATENT OFFICE 2,463,831

AMINO ALKYL BENZOATES

Glenn E. Ullyot, Philadelphia, Pa., assignor to Smith, Kline & French Laboratories, Philadelphia, Pa., a corporation of Pennsylvania No Drawing. Application February 2, 1946, Serial No. 645,227

8 Claims. (Cl. 260—472)

This invention relates to certain new compositions of matter useful therapeutically for the treatment of conditions of the human and animal system and, more particularly, for example, highly efficient for producing local anesthesia, and their method of preparation.

The new compositions of matter comprehended by this invention will comprise those chemical compounds embraced by the following structural formula:

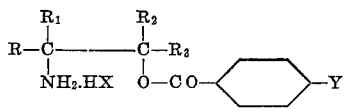

in which R, $R_1$, $R_2$ and $R_3$ are members of the group consisting of hydrogen and alkyl, in which the number of carbon atoms is less than six and where the sum of the carbon atoms in R, $R_1$, $R_2$ and $R_3$ is at least one and not greater than ten. X is a non-toxic acid radical, as, for example, Cl, Br, sulfate, acetate, citrate, or the like; and Y is a member of the group consisting of H and $NH_2$.

Specific examples of the compounds comprehended by this invention within the above basic structural formula will be made apparent by the following specific structural formulae:

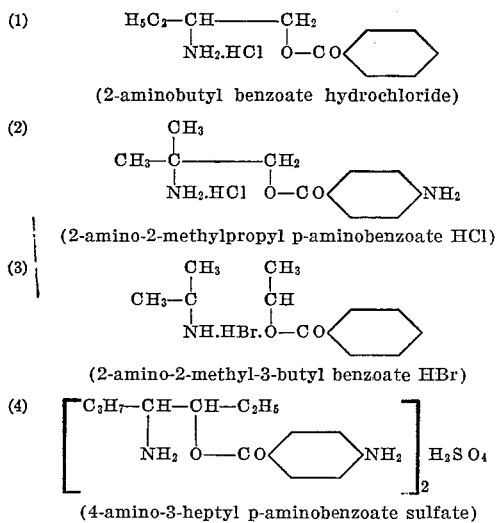

In general, for the preparation of the compounds comprehended by this invention, compounds in which Y=H may be conveniently prepared by mixing a β-primary amino alcohol inorganic acid addition product (as, for example, a β-primary amino alcohol hydrochloride) with the appropriate acyl halide and heating, preferably in the absence of a solvent, under conditions controlled to bring about reaction followed by the completion of the reaction in a suitable solvent such as 1-nitropropane, 1-nitrobutane, ethylene chloride, and the like. On completion of the reaction the product will be isolated by precipitation from the solution and purified by removal of any water-insoluble material.

For the preparation of the compounds in which Y=$NH_2$ the appropriate p-nitro compound may be prepared in the manner given above using the appropriate β-primary amino alcohol inorganic acid addition product and reacting with the appropriate p-nitro benzoyl halide. The nitro compound may then be reduced in an alcohol solution over a platinum or palladium catalyst under about three atmospheres of hydrogen pressure, the solvent removed by distillation and the product recrystallized from another suitable solvent as a mixture of acetone, alcohol and ether, or the like.

As more specifically illustrative of the preparation of compounds in accordance with this invention, for the preparation of the compound 2-aminobutyl benzoate hydrochloride, 2-amino-1-butanol was converted into a hydrochloride by addition of dry hydrogen chloride to a benzene or absolute alcohol solution of the amino alcohol. The product melted at 87–89° C. Sixty-two and five-tenths grams of the dry salt and 70 g. of benzoyl chloride were placed in a round-bottomed flask and heated on a steam bath for two and one-half hours. During this time, a clear yellow solution resulted, followed by the formation of a solid. Three hundred cubic centimeters of 1-nitropropane were added and the mixture was heated at 120–125° C. until the evolution of hydrogen chloride ceased (about two and one-half hours). The resulting solution was filtered to remove a small amount of insoluble material. The crystalline product obtained by cooling the filtrate was collected and washed with acetone. This crude 2-aminobutyl benzoate hydrochloride was purified by crystallization from a mixture of alcohol, acetone and petroleum ether. Thus, 43 g. were dissolved in 125 cc. of a mixture of 10% methyl alcohol and 90% ethyl alcohol and 200 cc. of acetone were added to the resulting solution. This solution was cooled and the small amount of precipitate which formed was removed by filtration. Two hundred cubic centimeters of acetone and 200 cc. of petroleum ether were now added to the filtrate. After cooling this solution overnight, 33.5 g. of colorless crystals were isolated. The product showed signs of softening at 160° C. and melted at 161–163.5° C. (closed capillary).

Anal.: Calculated for C₁₁H₁₆O₂NCl—Cl, 15.44; found—Cl, 15.95, 15.90.

As further illustrative, for the preparation of the compound 2-amino-2-methylpropyl benzoate hydrochloride, this product was prepared from 2-amino-2-methyl-1-propanol by the same procedure used for the conversion of 2-amino-1-butanol into 2-aminobutyl benzoate hydrochloride, as described above. Ninety-six grams of 2-amino-2-methyl-1-propanol hydrochloride (which showed signs of softening at 196° C. and melted at 198–202° C. (closed capillary)) and 108 grams of benzoyl chloride were used as reactants, and 200 cc. of 1-nitropropane were used as the reaction medium. One hundred-thirty grams of crude 2-amino-2-methylpropyl benzoate hydrochloride were obtained. Purification was effected by dissolving 65 g. of this product in a minimum amount of water. The free 2-amino-2-methylpropyl benzoate was liberated by the addition of solid potassium carbonate and taken up in benzene. The benzene solution was dried over anhydrous sodium sulfate overnight. Part of the benzene solution was then removed by distillation to insure removal of traces of water. The remaining solution was cooled and treated with dry hydrogen chloride. The resulting colorless crystalline precipitate was cooled and washed with acetone; yield, 43 g., melting point 223–224° C. (closed capillary).

Anal.: Calculated for C₁₁H₁₆O₂NCl—Cl, 15.44; found—Cl, 15.37, 15.36.

As further illustrative, for the preparation of the compound 2-aminobutyl p-aminobenzoate hydrochloride, one-tenth of a mole each of 2-amino-1-butanol hydrochloride and p-nitrobenzoyl chloride were placed in a 100 cc. round-bottomed flask and the temperature of the reaction mixture was gradually raised by heating. At 80–90° C., nearly all the mixture had melted and the evolution of hydrogen chloride took place. At 100° C. the reaction increased in speed and proceeded spontaneously. The heat source was removed and the temperature was allowed to rise to 130° C., at which point it was brought back to 90° C. by cooling the reaction flask with cold water. Controlled heating (reaction temperature 95–100° C.) was continued until the reaction mixture had completely solidified. Fifty cubic centimeters of 1-nitro-propane were added, and the reaction mixture was heated to 120° C. until the evolution of hydrogen chloride ceased, by which time most of the solid had dissolved. The traces of undissolved material were removed by filtration. On cooling and the addition of 50 cc. of petroleum ether to the filtrate, 25 g. of crystalline product was obtained. This crude 2-aminobutyl p-nitrobenzoate hydrochloride was extracted with 75 cc. of water. Most of it dissolved, and after filtration the aqueous solution was taken to dryness in vacuo. The residue was dissolved in a minimum amount of a boiling mixture of 10% methyl alcohol and 90% ethyl alcohol and recovered as colorless needles by the addition of 2 volumes of ethyl acetate to the alcohol solution and cooling. This 2-aminobutyl p-nitrobenzoate hydrochloride melted at 182–183° C. (Fisher block).

Anal.: Calculated for C₁₁H₁₅O₄N₂Cl—N, 10.20; found—N, 10.31, 10.43.

Thirteen and seven-tenths grams of this p-nitrobenzoate hydrochloride were dissolved in 100 cc. of a mixture of 10% methyl alcohol and 90% ethyl alcohol and 10 cc. of water, and reduced on the Burgess-Parr. apparatus at an initial pressure of 50 lbs./in.², using one g. of palladinized zirconium oxide as a catalyst. Fifteen one-hundredths of a mole of hydrogen was consumed. After removal of the catalyst, the solvent was removed in vacuo and the residue was crystallized from a hot mixture of 10% methyl alcohol and 90% ethyl alcohol. The crystalline product began to soften at about 186° C. and melted at 192–194.5° C. (closed capillary).

Anal.: Calculated for C₁₁H₁₇O₂N₂Cl—N, 11.44; found—N, 11.35, 11.44.

As further illustrative, for the preparation of the compound 2-amino-2-methylpropyl p-aminobenzoate hydrochloride, 2-amino-2-methyl-1-propanol hydrochloride was converted into 2-amino-2-methylpropyl p-nitrobenzoate in essentially the same manner as described for the conversion of 2-amino-1-butanol hydrochloride into 2-aminobutyl p-nitrobenzoate. However, the reaction did not appear to proceed spontaneously until the reactants had been raised to a temperature of approximately 120° C. Furthermore, the product was purified by crystallization from water; melting point 206–207° C. (Fisher block).

Anal.: Calculated for C₁₁H₁₅O₄N₂Cl—N, 10.20; found—N, 10.31, 10.21.

This 2-amino-2-methylpropyl p-nitrobenzoate hydrochloride was reduced in the manner described above for the reduction of 2-aminobutyl p-nitrobenzoate hydrochloride. After crystallization from a mixture of 10% methyl alcohol and 90% ethyl alcohol and ether, the 2-amino-2-methylpropyl p-aminobenzoate hydrochloride melted at 239–241° C. dec. (capillary). This decomposition range varied considerably with the rate of heating.

Anal.: Calculated for C₁₁H₁₇O₂NCl—N, 11.44; found—N, 11.38, 11.46.

What I claim and desire to protect by Letters Patent is:

1. A compound having the structure:

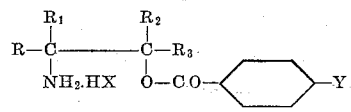

in which R, R₁, R₂ and R₃ are members of the group consisting of hydrogen and alkyl, in which the number of carbon atoms is less than six and where the sum of the carbon atoms in R, R₁, R₂ and R₃ is at least two and not greater than five, X is an acid radical; and Y is a member of the group consisting of H and NH₂.

2. A compound having the structure:

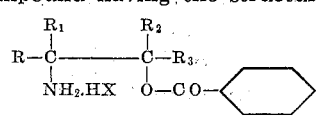

in which R, R₁, R₂ and R₃ are members of the group consisting of hydrogen and alkyl, in which the number of carbon atoms is less than six and where the sum of the carbon atoms in R, R₁, R₂ and R₃ is at least two and not greater than five, and X is an acid radical.

3. A compound having the structure:

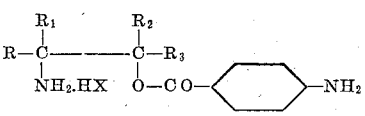

in which R, R₁, R₂ and R₃ are members of the group consisting of hydrogen and alkyl, in which the number of carbon atoms is less than six and where the sum of the carbon atoms in R, R₁, R₂ and R₃ is at least two and not greater than five, and X is an acid radical.

4. A compound having the structure:

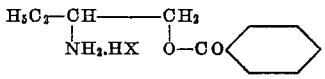

in which X is an acid radical.

5. A compound having the structure:

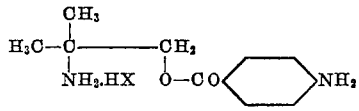

in which X is an acid radical.

6. A compound having the structure:

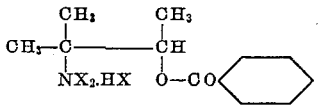

in which X is an acid radical.

7. A compound having the structure:

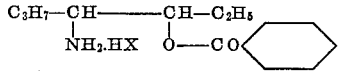

in which X is an acid radical.

8. A compound having the structure:

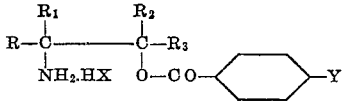

in which R, R₁, R₂ and R₃ are members of the group consisting of hydrogen and alkyl, in which the number of carbon atoms is less than six and where the sum of the carbon atoms in R, R₁, R₂ and R₃ is not less than two, X is an acid radical and Y is a member of the group consisting of H and NH₂.

GLENN E. ULLYOT.

REFERENCES CITED

The following references are of record in the file of this patent:

UNITED STATES PATENTS

| Number | Name | Date |
|---|---|---|
| 1,513,730 | Adams et al. | Nov. 4, 1924 |
| 1,590,792 | Adams et al. | June 29, 1926 |
| 2,372,116 | Pierce et al. | Mar. 20, 1945 |

OTHER REFERENCES

Gabriel et al., Ber. Deut. Chem., vol. 23 (1890), page 2501.

Jacobs, Jour. Biol. Chem., vol. 21 (1915), pp. 424–426.

Graf, Arch Exptl. Path. Pharm., vol. 99 (1923), pp. 315–345.

Mannich, Chem. Zentralblatt, vol. 105 (1934), p. 3217.

Barrow and Ferguson, Jour. Chem. Soc. (London) (1935), p. 417.

Michael et al., Jour. Organ. Chem., vol. 4 (1939), pp. 169–197.

Pierce et al., Jour. American Chem. Society, vol. 64 (1942), pp. 2884–2885.

Reasenberg et al., Jour. American Chem. Society, vol. 66 (1944), pp. 991–994.